(12) United States Patent
Cheng et al.

(10) Patent No.: US 11,606,788 B2
(45) Date of Patent: *Mar. 14, 2023

(54) METHOD FOR SENDING CONTROL INFORMATION, METHOD FOR RECEIVING CONTROL INFORMATION, NETWORK DEVICE, AND TERMINAL DEVICE

(71) Applicant: HUAWEI TECHNOLOGIES CO., LTD., Guangdong (CN)

(72) Inventors: Yan Cheng, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,235

(22) Filed: Dec. 22, 2020

(65) Prior Publication Data

US 2021/0185671 A1    Jun. 17, 2021

Related U.S. Application Data

(63) Continuation of application No. 16/232,026, filed on Dec. 25, 2018, now Pat. No. 10,917,886, which is a
(Continued)

(30) Foreign Application Priority Data

Jun. 25, 2016    (CN) .......................... 201610473937.X

(51) Int. Cl.
*H04W 72/04*    (2009.01)
*H04L 5/00*    (2006.01)
(Continued)

(52) U.S. Cl.
CPC ...... *H04W 72/0446* (2013.01); *H04B 7/0617* (2013.01); *H04L 5/0051* (2013.01);
(Continued)

(58) Field of Classification Search
CPC ............ H04W 72/0446; H04W 72/042; H04B 7/0617; H04L 5/0051; H04L 5/0053; H04L 5/0007; H04L 5/0048
See application file for complete search history.

(56) References Cited

U.S. PATENT DOCUMENTS

| 11,063,730 B2 * | 7/2021 | Yoshimura ............ H04L 5/0053 |
| 2011/0026622 A1 * | 2/2011 | Luo ....................... H04L 1/1867 |
| | | 375/340 |

(Continued)

FOREIGN PATENT DOCUMENTS

| CN | 103002581 | 3/2013 |
| CN | 103347298 | 10/2013 |

(Continued)

OTHER PUBLICATIONS

Office Action issued in Chinese Application No. 202011569622.8 dated Sep. 15, 2021, 14 pages (with English translation).

(Continued)

*Primary Examiner* — Tejis Daya
(74) *Attorney, Agent, or Firm* — Fish & Richardson P.C.

(57) ABSTRACT

The present disclosure provides a method including: determining, by a network device, a resource element group corresponding to a control channel, where the resource element group includes a first resource element for carrying downlink control information and a second resource element for carrying a reference signal, and the reference signal is used to demodulate the downlink control information carried by the resource element group; and sending the downlink control information by using the control channel, wherein resource elements comprised in the resource element group are distributed in all symbols of a time domain resource occupied by the control channel. This provides a possibility of supporting forward compatibility.

18 Claims, 3 Drawing Sheets

Related U.S. Application Data continuation of application No. PCT/CN2017/089562, filed on Jun. 22, 2017.

(51) Int. Cl.
  *H04B 7/06* (2006.01)
  *H04W 72/0446* (2023.01)

(52) U.S. Cl.
  CPC ......... *H04L 5/0053* (2013.01); *H04W 72/042* (2013.01); *H04L 5/0007* (2013.01)

(56) References Cited

U.S. PATENT DOCUMENTS

| | | |
|---|---|---|
| 2012/0275406 A1 | 11/2012 | Ji et al. |
| 2013/0195047 A1 | 8/2013 | Koivisto et al. |
| 2013/0242947 A1* | 9/2013 | Chen ............... H04L 1/0061 370/335 |
| 2013/0294366 A1 | 11/2013 | Papasakellariou et al. |
| 2013/0343300 A1 | 12/2013 | Kim et al. |
| 2014/0044070 A1 | 2/2014 | Chen et al. |
| 2014/0050159 A1 | 2/2014 | Frenne et al. |
| 2014/0204825 A1 | 7/2014 | Ekpenyong et al. |
| 2014/0328305 A1* | 11/2014 | Kim ............... H04L 5/0053 370/329 |
| 2015/0016376 A1 | 1/2015 | Seo et al. |
| 2015/0036653 A1 | 2/2015 | Kim et al. |
| 2015/0131560 A1* | 5/2015 | Von Elbwart ....... H04W 72/048 370/329 |
| 2015/0146658 A1 | 5/2015 | Liu et al. |
| 2015/0208390 A1 | 7/2015 | Zhao et al. |
| 2015/0245323 A1* | 8/2015 | You ............... H04W 72/042 370/329 |
| 2015/0249517 A1 | 9/2015 | Seo et al. |
| 2017/0290046 A1* | 10/2017 | Sun ............... H04L 5/0053 |
| 2017/0347270 A1 | 11/2017 | Iouchi et al. |
| 2018/0309489 A1 | 10/2018 | Hosseini et al. |
| 2018/0323944 A1 | 11/2018 | Wang et al. |
| 2018/0375629 A1* | 12/2018 | Lee ............... H04L 5/0051 |

FOREIGN PATENT DOCUMENTS

| | | |
|---|---|---|
| CN | 103580838 | 2/2014 |
| CN | 104025494 A | 9/2014 |
| CN | 104170297 A | 11/2014 |
| CN | 104685820 A | 6/2015 |
| CN | 104904305 A | 9/2015 |
| CN | 105210342 | 12/2015 |
| EP | 2804433 | 11/2014 |
| JP | 2015216703 | 12/2015 |
| WO | 2013100623 | 7/2013 |
| WO | 2016072495 | 5/2016 |

OTHER PUBLICATIONS

HTC: "RE mapping for ePDCCH", 3GPP Draft; R1-123862, vol. RAN WG1, No. Qingdao, China Aug. 13, 2012-Aug. 17, 2012, Aug. 13, 2012, XP050661716, 7 pages.

LG Electronics, Discussions on DCI and sPDCCH for latency reduction, 3GPP TSG-RAN WG1#85 R1-164542, May 14, 2016, Total 8 Pages.

Samsung: "Discussions on control signaling for NR", 3GPP Draft; R1-163994, vol. RAN WG1, No. Nanjing, China; May 23, 2016-May 27, 2016, May 13, 2016, XP051090305, 3 pages.

* cited by examiner

METHOD FOR SENDING CONTROL INFORMATION, METHOD FOR RECEIVING CONTROL INFORMATION, NETWORK DEVICE, AND TERMINAL DEVICE

CROSS-REFERENCE TO RELATED APPLICATIONS

This application is a continuation of U.S. patent application Ser. No. 16/232,026, filed on Dec. 25, 2018, which is a continuation of International Application No. PCT/CN2017/089562, filed on Jun. 22, 2017, which claims priority to Chinese Patent Application No. 201610473937.X, filed on Jun. 25, 2016. All of the afore-mentioned patent applications are hereby incorporated by reference in their entireties.

TECHNICAL FIELD

The present disclosure relates to the wireless communications field, and in particular, to a technology for sending control information, a technology for receiving control information, and a corresponding network device and terminal device.

BACKGROUND

The development of a communications system has been devoted to supporting higher system performance, to support a variety of different services, different deployment scenarios, and different spectrums. The different services include enhanced mobile broadband (eMBB), machine type communication (MTC), ultra-reliable and low latency communications (URLLC), multimedia broadcast multicast service (MBMS), positioning, and the like. The different deployment scenarios include an indoor hotspot scenario, a dense urban scenario, a suburban scenario, an urban macro scenario, a high-speed railway scenario, and the like.

A future communications system such as a new radio (NR) system is devoted to supporting a wider frequency range, including a higher frequency spectrum range. In addition, the new NR system also needs to be capable of flexibly allowing introduction of future unknown characteristics, and the introduction of future unknown characteristics will not cause terminal devices supporting only existing communications system designs not to work. The NR communications system needs a new system design. How to design a control channel in the NR communications system is a technical problem that urgently needs to be resolved currently.

SUMMARY

Embodiments of the present disclosure provide a method for sending control information, a method for receiving control information, a network device, and a terminal device, to improve compatibility of a control channel.

According to a first aspect, a method for sending control information is provided, including:

determining, by a network device, a resource element group corresponding to a control channel, where the resource element group includes a first resource element for carrying downlink control information and a second resource element for carrying a reference signal, and the reference signal is used to demodulate the downlink control information carried by the resource element group; and sending, by the network device, the downlink control information by using the control channel.

Optionally, the downlink control information carried by the resource element group is demodulated based on only the reference signal carried by the resource element group. Therefore, a time-frequency resource corresponding to another resource can be flexibly used to send future unknown services, so as to be capable of supporting future new characteristics and being compatible with a current terminal device. This better supports forward compatibility.

Optionally, a quantity of resource elements included in the resource element group is directly proportional to a quantity of symbols occupied by the resource element group; or a quantity of resource elements included in the resource element group is directly proportional to a quantity of symbols occupied by the control channel.

Optionally, the second resource element is in one symbol of a time domain resource occupied by the resource element group, for example, in a $1^{st}$ symbol of the time domain resource occupied by the resource element group, in a $1^{st}$ symbol of a time domain resource occupied by the control channel, or in a $1^{st}$ symbol of a subframe that carries the control channel.

Optionally, resource elements included in the resource element group are distributed in all symbols of a time domain resource occupied by the control channel.

Optionally, frequency domain resources occupied by the resource element group are the same in all symbols occupied by the resource element group; or frequency domain resources occupied by the resource element group are the same in all symbols occupied by the control channel. Resource elements occupied by the resource element group are consecutive in each symbol occupied by the resource element group; or resource elements occupied by the resource element group are consecutive in each symbols occupied by the control channel.

Optionally, the network device determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines the resource element group based on $N_{REG}^{RU}$. Specifically, the control channel may occupy l symbols in time domain. Preferably, is equal to 12 or 16.

Optionally, the network device determines $N_{REG}^{RU}$ based on a quantity of resource elements corresponding to one antenna port, where the antenna port is one of at least one antenna port corresponding to the reference signal, the resource element corresponding to the antenna port is in one symbol, and the one symbol is one of symbols that are in the resource block and that carry the reference signal.

Optionally, the network device determines $N_{REG}^{RU}$ based on a quantity of resource elements corresponding to one antenna port, where the antenna port is one of at least one antenna port corresponding to the reference signal, the resource element corresponding to the antenna port is in one symbol, and the symbol is one of symbols in the resource block that carry the reference signal. Specifically, the network device determines, based on $N_{REG}^{RU}$, a quantity of resource elements included in the resource element group, where the quantity of resource elements included in the resource element group is equal to $(N_{sc}^{RU}/N_{REG}^{RU}) \times l$. A quantity of first resource elements included in the resource element group is $N_{RE}^{DCI}$, where $N_{RE}^{DCI} = (N_{sc}^{RU}/N_{REG}^{RU}) \times (l-1) + ((N_{sc}^{RU}/N_{REG}^{RU}) - N_{antenna\,port}^{RU})$, and $N_{antenna\,port}^{RU}$ is a quantity of antenna ports corresponding to the reference signal. If the control channel occupies one symbol, a quantity of resource element groups included in one control channel element is $N_{REG}^{CCE}$; or if the control channel occupies l symbols, a quantity of resource element groups included in one control channel element is $$\left[\frac{N_{REG}^{CCE} \times \left(\left(N_{sc}^{RU} / N_{REG}^{RU}\right) - N_{antenna\ port}^{RU}\right)}{\left(N_{sc}^{RU} / N_{REG}^{RU}\right) \times (l-1) + \left(\left(N_{sc}^{RU} / N_{REG}^{RU}\right) - N_{antenna\ port}^{RU}\right)}\right].$$

Optionally, the network device sends the downlink control information in a subframe n by using the control channel, where n is an integer greater than or equal to 0. The downlink control information includes antenna port information. The antenna port information is used to indicate an antenna port corresponding to a control channel carried in a subframe n+k, where k is an integer greater than or equal to 0. The antenna port information is information about antenna ports respectively corresponding to a plurality of terminal devices.

Optionally, the network device sends system information. The system information includes information about the antenna port corresponding to the reference signal. Preferably, a quantity of antenna ports corresponding to the reference signal is equal to 2.

According to a second aspect, a method for receiving control information is provided, including:

determining, by a terminal device, a resource element group corresponding to a control channel, where the resource element group includes a first resource element for carrying downlink control information and a second resource element for carrying a reference signal, and the terminal device demodulates, based on the reference signal, the downlink control information carried by the resource element group; and receiving, by the terminal device, the downlink control information on the control channel.

Optionally, the terminal device demodulates, based on only the reference signal carried by the resource element group, the downlink control information carried by the resource element group.

Optionally, a quantity of resource elements included in the resource element group is directly proportional to a quantity of symbols occupied by the resource element group; or a quantity of resource elements included in the resource element group is directly proportional to a quantity of symbols occupied by the control channel.

Optionally, the second resource element is in one symbol of a time domain resource occupied by the resource element group, for example, in a $1^{st}$ symbol of the time domain resource occupied by the resource element group, in a $1^{st}$ symbol of a time domain resource occupied by the control channel, or in a $1^{st}$ symbol of a subframe that carries the control channel.

Optionally, resource elements included in the resource element group are distributed in all symbols of a time domain resource occupied by the control channel.

Optionally, frequency domain resources occupied by the resource element group are the same in all symbols occupied by the resource element group; or frequency domain resources occupied by the resource element group are the same in all symbols occupied by the control channel. Resource elements occupied by the resource element group are consecutive in each symbol occupied by the resource element group; or resource elements occupied by the resource element group are consecutive in each symbols occupied by the control channel.

Optionally, the terminal device determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines the resource element group based on $N_{REG}^{RU}$. Specifically, the control channel may occupy l symbols in time domain. Preferably, $N_{sc}^{RU}$ is equal to 12 or 16.

Optionally, the terminal device determines $N_{REG}^{RU}$ based on a quantity of resource elements corresponding to one antenna port, where the antenna port is one of at least one antenna port corresponding to the reference signal, the resource element corresponding to the antenna port is in one symbol, and the symbol is one of symbols in the resource block that carry the reference signal. The terminal device determines, based on $N_{REG}^{RU}$, a quantity of resource elements included in the resource element group, where the quantity of resource elements included in the resource element group is equal to $(N_{sc}^{RU}/N_{REG}^{RU}) \times l$. A quantity of first resource elements included in the resource element group is $N_{RE}^{DCI}$, where $N_{RE}^{DCI}=(N_{sc}^{RU}/N_{REG}^{RU}) \times (l-1) + ((N_{sc}^{RU}/N_{REG}^{RU})-N_{antenna\ port}^{RU})$, and $N_{antenna\ port}^{RU}$ is a quantity of antenna ports corresponding to the reference signal. If the control channel occupies one symbol, a quantity of resource element groups included in one control channel element is $N_{REG}^{CCE}$; or if the control channel occupies l symbols, a quantity of resource element groups included in one control channel element is $$\left[\frac{N_{REG}^{CCE} \times \left(\left(N_{sc}^{RU} / N_{REG}^{RU}\right) - N_{antenna\ port}^{RU}\right)}{\left(N_{sc}^{RU} / N_{REG}^{RU}\right) \times (l-1) + \left(\left(N_{sc}^{RU} / N_{REG}^{RU}\right) - N_{antenna\ port}^{RU}\right)}\right].$$

Optionally, the terminal device receives the downlink control information in a subframe n by using the control channel, where n is an integer greater than or equal to 0. The downlink control information includes antenna port information. The antenna port information is used to indicate an antenna port corresponding to a control channel carried in a subframe n+k, where k is an integer greater than or equal to 0. The antenna port information is information about antenna ports respectively corresponding to a plurality of terminal devices.

Optionally, the terminal device receives system information. The system information includes information about the antenna port corresponding to the reference signal. Preferably, a quantity of antenna ports corresponding to the reference signal is equal to 2.

According to a third aspect, a network device is provided, including a processing unit and a transmit unit, where the processing unit is configured to determine a resource element group corresponding to a control channel, where the resource element group includes a first resource element for carrying downlink control information and a second resource element for carrying a reference signal, and the reference signal is used to demodulate the downlink control information carried by the resource element group; and the transmit unit is configured to send the downlink control information by using the control channel.

Optionally, the downlink control information carried by the resource element group is demodulated based on only the reference signal carried by the resource element group. Therefore, a time-frequency resource corresponding to another resource can be flexibly used to send future unknown services, so as to be capable of supporting future new characteristics and being compatible with a current terminal device. This better supports forward compatibility.

Optionally, a quantity of resource elements included in the resource element group is directly proportional to a quantity of symbols occupied by the resource element group; or a quantity of resource elements included in the resource element group is directly proportional to a quantity of symbols occupied by the control channel.

Optionally, the second resource element is in one symbol of a time domain resource occupied by the resource element group, for example, in a $1^{st}$ symbol of the time domain resource occupied by the resource element group, in a $1^{st}$ symbol of a time domain resource occupied by the control channel, or in a $1^{st}$ symbol of a subframe that carries the control channel.

Optionally, resource elements included in the resource element group are distributed in all symbols of a time domain resource occupied by the control channel.

Optionally, frequency domain resources occupied by the resource element group are the same in all symbols occupied by the resource element group; or frequency domain resources occupied by the resource element group are the same in all symbols occupied by the control channel. Resource elements occupied by the resource element group are consecutive in each symbol occupied by the resource element group; or resource elements occupied by the resource element group are consecutive in each symbol occupied by the control channel.

Optionally, the processing unit determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines the resource element group based on $N_{REG}^{RU}$. Specifically the control channel may occupy l symbols in time domain. Preferably, $N_{sc}^{RU}$ is equal to 12 or 16.

Optionally, the processing unit determines $N_{REG}^{RU}$ based on a quantity of resource elements corresponding to one antenna port, where the antenna port is one of at least one antenna port corresponding to the reference signal, the resource element corresponding to the antenna port is in one symbol, and the symbol is one of symbols in the resource block that carry the reference signal.

Optionally, the processing unit determines $N_{REG}^{RU}$ based on a quantity of resource elements corresponding to one antenna port, where the antenna port is one of at least one antenna port corresponding to the reference signal, the resource element corresponding to the antenna port is in one symbol, and the symbol is one of symbols in the resource block that carry the reference signal. Specifically, the processing unit determines, based on $N_{REG}^{RU}$, a quantity of resource elements included in the resource element group, where the quantity of resource elements included in the resource element group is equal to $(N_{sc}^{RU}/N_{REG}^{RU}) \times l$. A quantity of first resource elements included in the resource element group is $N_{RE}^{DCI}$, where $N_{RE}^{DCI}=(N_{sc}^{RU}/N_{REG}^{RU}) \times (l-1)+((N_{sc}^{RU}/N_{REG}^{RU})-N_{antenna\ port}^{RU})$, and $N_{antenna\ port}^{RU}$ is a quantity of antenna ports corresponding to the reference signal. If the control channel occupies one symbol, a quantity of resource element groups included in one control channel element is $N_{REG}^{CCE}$; or if the control channel occupies l symbols, a quantity of resource element groups included in one control channel element is $$\left[ \frac{N_{REG}^{CCE} \times \left( \left( N_{sc}^{RU} / N_{REG}^{RU} \right) - N_{antenna\ port}^{RU} \right)}{\left( N_{sc}^{RU} / N_{REG}^{RU} \right) \times (l-1) + \left( \left( N_{sc}^{RU} / N_{REG}^{RU} \right) - N_{antenna\ port}^{RU} \right)} \right].$$

Optionally, the transmit unit sends the downlink control information in a subframe n by using the control channel, where n is an integer greater than or equal to 0. The downlink control information includes antenna port information. The antenna port information is used to indicate an antenna port corresponding to a control channel carried in a subframe n+k, where k is an integer greater than or equal to 0. The antenna port information is information about antenna ports respectively corresponding to a plurality of terminal devices.

Optionally, the transmit unit sends system information. The system information includes information about the antenna port corresponding to the reference signal. Preferably, a quantity of antenna ports corresponding to the reference signal is equal to 2.

Optionally, corresponding functional units in this embodiment may be implemented by corresponding hardware, or may be implemented by corresponding hardware executing corresponding software. For example, the transmit unit may be hardware capable of executing the foregoing functions of a sending module, for example, a transmitter, or may be a general purpose processor or another hardware device capable of executing a corresponding computer program to complete the foregoing functions. For another example, the processing unit may be hardware capable of executing the foregoing functions of a processing module, for example, a processor, or may be another hardware device capable of executing a corresponding computer program to complete the foregoing functions.

According to a fourth aspect, a terminal device is provided, including a processing unit and a receive unit, where the processing unit is configured to determine a resource element group corresponding to a control channel, where the resource element group includes a first resource element for carrying downlink control information and a second resource element for carrying a reference signal, and the downlink control information carried by the resource element group is demodulated based on the reference signal; and the receive unit is configured to receive the downlink control information on the control channel.

Optionally, the processing unit demodulates, based on only the reference signal carried by the resource element group, the downlink control information carried by the resource element group.

Optionally, a quantity of resource elements included in the resource element group is directly proportional to a quantity of symbols occupied by the resource element group; or a quantity of resource elements included in the resource element group is directly proportional to a quantity of symbols occupied by the control channel.

Optionally, the second resource element is in one symbol of a time domain resource occupied by the resource element group, for example, in a $1^{st}$ symbol of the time domain resource occupied by the resource element group, in a $1^{st}$ symbol of a time domain resource occupied by the control channel, or in a $1^{st}$ symbol of a subframe that carries the control channel.

Optionally, resource elements included in the resource element group are distributed in all symbols of a time domain resource occupied by the control channel.

Optionally, frequency domain resources occupied by the resource element group are the same in all symbols occupied by the resource element group; or frequency domain resources occupied by the resource element group are the same in all symbols occupied by the control channel. Resource elements occupied by the resource element group are consecutive in each symbol occupied by the resource element group; or resource elements occupied by the resource element group are consecutive in each symbol occupied by the control channel.

Optionally, the processing unit determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines the resource element group based on $N_{REG}^{RU}$. Specifically, the control channel may occupy l symbols in time domain. Preferably, $N_{sc}^{RU}$ is equal to 12 or 16.

Optionally, the processing unit determines $N_{REG}^{RU}$ based on a quantity of resource elements corresponding to one antenna port, where the antenna port is one of at least one antenna port corresponding to the reference signal, the resource element corresponding to the antenna port is in one symbol, and the symbol is one of symbols in the resource block that carry the reference signal. The processing unit determines, based on $N_{REG}^{RU}$, a quantity of resource elements included in the resource element group, where the quantity of resource elements included in the resource element group is equal to $(N_{sc}^{RU}/N_{REG}^{RU}) \times l$. A quantity of first resource elements included in the resource element group is $N_{RE}^{DCI}$, where $N_{RE}^{DCI}=(N_{sc}^{RU}/N_{REG}^{RU}) \times (l-1) + ((N_{sc}^{RU}/N_{REG}^{RU}) - N_{antenna\ port}^{RU})$, and $N_{antenna\ port}^{RU}$ is a quantity of antenna ports corresponding to the reference signal. If the control channel occupies one symbol, a quantity of resource element groups included in one control channel element is $N_{REG}^{CCE}$; or if the control channel occupies l symbols, a quantity of resource element groups included in one control channel element is $$\left\lceil \frac{N_{REG}^{CCE} \times \left( \left( N_{sc}^{RU} / N_{REG}^{RU} \right) - N_{antenna\ port}^{RU} \right)}{\left( N_{sc}^{RU} / N_{REG}^{RU} \right) \times (l-1) + \left( \left( N_{sc}^{RU} / N_{REG}^{RU} \right) - N_{antenna\ port}^{RU} \right)} \right\rceil.$$

Optionally, the receive unit receives the downlink control information in a subframe n by using the control channel, where n is an integer greater than or equal to 0. The downlink control information includes antenna port information. The antenna port information is used to indicate an antenna port corresponding to a control channel carried by a subframe n+k, where k is an integer greater than or equal to 0. The antenna port information is information about antenna ports respectively corresponding to a plurality of the terminal devices.

Optionally, the processing unit receives system information. The system information includes information about the antenna port corresponding to the reference signal. Preferably, a quantity of antenna ports corresponding to the reference signal is equal to 2.

Optionally, corresponding functional units in this embodiment may be implemented by corresponding hardware, or may be implemented by corresponding hardware executing corresponding software. For example, the processing unit may be hardware capable of executing the functions of a processing module, for example, a processor, or may be another hardware device capable of executing a corresponding computer program to complete the foregoing functions. For another example, the receive unit may be hardware capable of executing the foregoing functions of a receive module, for example, a receiver, or may be a general purpose processor or another hardware device capable of executing a corresponding computer program to complete the foregoing functions.

The embodiments of the present disclosure provide a resource element group. A network device may send downlink control information to a terminal device based on the defined resource element group by using a control channel. The resource element group carries the downlink control information and a reference signal for demodulating the downlink control information.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art better understand the solutions in the embodiments of the present disclosure, the following further describes the embodiments of the present disclosure with reference to the accompanying drawings and implementations.

Figure 1:
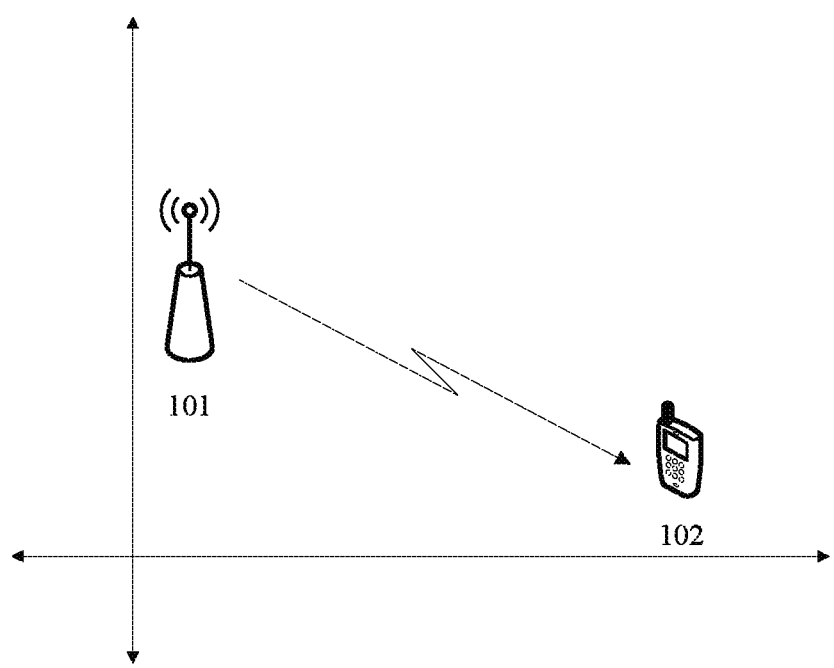
FIG. 1 is a schematic diagram of an application scenario of a communications system according to an embodiment of the present disclosure.

The embodiments of the present disclosure may be applied to communications systems of 5th Generation (5G), new radio (NR), long term evolution (LTE), or the like. NR is a new radio access technology, or a system using a new radio access technology. In the NR communications system, control information is transmitted by using a control channel, and the control channel may be defined by using a resource element group (REG) and/or a control channel element (CCE). The resource element group may be a combination of a plurality of resource elements. The control channel element may be a combination of a plurality of resource element groups. An REG in the NR communications system may also be referred to an NR-REG and a CCE in the NR communications system may also be referred to an NR-CCE. Application of the present disclosure to the communications system mainly includes sending of downlink control information between a network device 101 and a terminal device 102, as shown in FIG. 1.

It should be noted that the network device 101 in the embodiments of the present disclosure is a network-side network element, and may be a base station, an access point, a core network element, or an access network element. The base station may be configured to perform mutual conversion on a received over-the-air frame and an Internet Protocol (IP) packet and serve as a router between a wireless terminal and a rest part of an access network. The rest part of the access network may include an IP network. The base station may further coordinate attribute management of an air interface. For example, the base station may be a base transceiver station (BTS) in Global System for Mobile Communications (GSM) or Code Division Multiple Access (CDMA), or may be a NodeB in Wideband Code Division Multiple Access (WCDMA), or may be an evolved NodeB (eNB or e-NodeB) in LTE, or may be a new network element on a network side in a future 5G NR, or LTE system. This is not limited in this application.

It should be noted that, the terminal device 102 in the embodiments of the present disclosure may be a device that provides a user with voice and/or data connectivity, a handheld device with a wireless connection function, or another processing device connected to a wireless modem. The wireless device or unit may be a mobile terminal, such as a mobile phone (or referred to as a "cellular" phone) and a computer that has a mobile terminal, for example, may be a portable mobile apparatus, a pocket-size mobile apparatus, a handheld mobile apparatus, a computer built-in mobile apparatus, or an in-vehicle mobile apparatus; and exchanges voice and/or data with a radio access network. For example, the wireless device or unit may be a device such as a personal communications service (PCS) phone, a cordless phone, a Session Initiation Protocol phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a terminal device (for example; User Device), or user equipment (UE).

The embodiments of the present disclosure provide a method for sending control information, and a network device and a terminal device thereof. The control information is sent or received by using a control channel. The control channel includes a plurality of control channel elements. The plurality of control channel elements are used to carry the control information. The network device or the terminal device needs to determine a resource element group corresponding to the control channel, and sends or receives the control information based on the resource element group by using the control channel. The resource element group includes a plurality of resource elements.

In a conventional wireless communications system, a corresponding control channel format is designed for a specific communications system, and cannot be well compatible with new characteristics of a future communications system or transmission/reception of unknown services. In other words, a control channel design of the conventional wireless communications system is not flexible enough. In the solution provided in the embodiments of the present disclosure, the control channel can be flexibly designed, to improve compatibility with the new characteristics of the communications system or new services.

Figure 2:
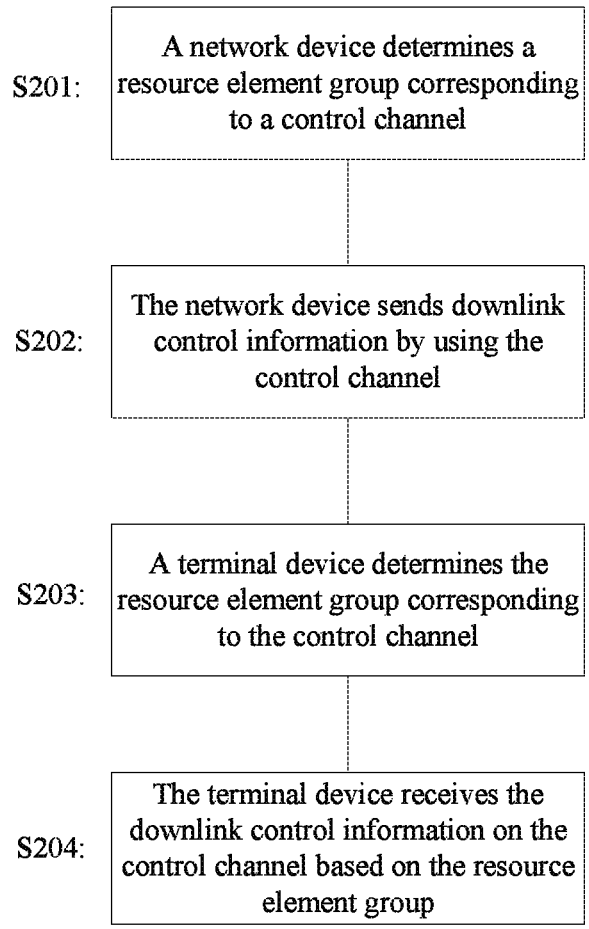
FIG. 2 is a schematic flowchart of a method for sending control information according to an embodiment of the present disclosure.

The following describes, with reference to FIG. 2, the solution provided in the embodiments of the present disclosure.

S201: A network device determines a resource element group corresponding to a control channel.

S202: The network device sends downlink control information by using the control channel.

S203: A terminal device determines the resource element group corresponding to the control channel.

It should be noted that step S203 may be performed before step S201 or S202, and an execution order between step S203, S201, and S202 is not limited.

S204: The terminal device receives the downlink control information on the control channel based on the resource element group.

In the foregoing embodiment, the resource element group includes a first resource element for carrying the downlink control information and a second resource element for carrying a reference signal, and the reference signal is used to demodulate the downlink control information carried by the resource element group. The terminal device demodulates, based on the reference signal carried by the second resource element, the downlink control information carried by the first resource element.

According to the resource element group in this embodiment of the present disclosure, the network device sends the downlink control information to the terminal device based on the resource element group by using the control channel, thereby resolving a problem of how to design a control channel in an NR communications system, and implementing interaction between a network device and a terminal device in the NR communications system. The resource element group carries the downlink control information and the reference signal, and the reference signal is used to demodulate the downlink control information carried by the resource element group, providing a possibility that the downlink control information carried by the resource element group is demodulated based on only the reference signal carried by the resource element group. This provides a possibility that a time-frequency resource corresponding to another resource element group can be flexibly used to send a future unknown service, and provides a possibility of effectively supporting forward compatibility.

It should be noted that in this embodiment of the present disclosure, the network device sends the downlink control information and the reference signal, the terminal device demodulates the received downlink control information based on the reference signal, and the network device and the terminal device determine, in a same manner, a resource element group corresponding to a control channel that carries the downlink control information and the reference signal. The following elaborates and explains a processing procedure by using an example of a method for sending control information by the network device. A method used by the terminal device to determine a resource element group and perform demodulation corresponding to the resource element group is the same as that used by the network device. For details, refer to a procedure of the method for sending control information by the network device.

In an embodiment of the present disclosure, the network device determines the resource element group corresponding to the control channel, and the resource element group corresponding to the control channel may be one resource element group corresponding to the control channel. In this case, the reference signal is used to demodulate the downlink control information carried by the resource element group.

In another optional embodiment, the network device determines the resource element group corresponding to the control channel, and the resource element group corresponding to the control channel may be each of a plurality of resource element groups corresponding to the control channel. In this case, the reference signal is used to demodulate downlink control information carried by one or more of the plurality of resource element groups.

For the case in which the resource element group corresponding to the control channel is each of a plurality of resource element groups, there may be a plurality of relationships between the reference signal and the downlink control information.

In an implementation, for each of the plurality of resource element groups corresponding to the control channel, a reference signal carried by each resource element group may be used to demodulate downlink control information carried by the resource element group that carries the reference signal, and may also be used to demodulate downlink control information carried by another resource element group. To be specific, reference signals carried by the plurality of resource element groups may be used to demodulate downlink control information carried by the plurality of resource element groups. For example, there are two resource element groups corresponding to a control channel: a resource element group 1 and a resource element group 2; a reference signal carried by the resource element group 1 may be used to demodulate downlink control information carried by the resource element group 1 and may also be used to demodulate downlink control information carried by the resource element group 2.

Specifically, when the reference signals carried by the plurality of resource element groups are used to demodulate the downlink control information carried by the plurality of resource element groups, the plurality of resource element groups may be a plurality of resource element groups corresponding to one terminal device, or may be a plurality of resource element groups corresponding to different terminal devices.

In another implementation, for each of the plurality of resource element groups corresponding to the control channel, downlink control information carried by each resource element group is demodulated based on only a reference signal carried by the resource element group, to be specific, demodulation of downlink control information carried by a resource element group does not rely on a reference signal carried by another resource element group; or downlink control information carried by each resource element group is demodulated based on only reference signals carried by a plurality of consecutive resource element groups corresponding to one terminal device. The foregoing two types of resource element groups are referred to as self-contained resource element groups. For example, when there are two resource element groups corresponding to a control channel: a resource element group 1 and a resource element group 2, a reference signal carried by the resource element group 1 can be used to demodulate only downlink control information carried by the resource element group 1, and downlink control information carried by the resource element group 2 cannot be demodulated by using the reference signal carried by the resource element group 1. Alternatively, when there are a plurality of resource element groups corresponding to a control channel: a resource element group 1, a resource element group 2, . . . , and a resource element group k, k is greater than or equal to 3, and the resource element group 1, the resource element group 2, and the resource element group 3 are a plurality of consecutive resource element groups corresponding to one terminal device, downlink control information carried by the resource element group 1 may be demodulated based on reference signals carried by the resource element groups 1 to 3. In this implementation, the reference signal is used to demodulate the downlink control information carried by the resource element group, providing a possibility of performing transmission in different beam directions by using different resource element groups corresponding to different terminal devices, thereby providing a possibility that a terminal device transmits a control channel in a specific beam direction, and improving coverage of the control channel.

Further, optionally, the self-contained resource element group does not rely on a reference signal carried by another resource element group, the another resource element group may be a resource element group corresponding to the same terminal device, or may be a resource element group corresponding to another terminal device. If the another resource element group is a resource element group corresponding to the same terminal device, the another resource element group may be a resource element group corresponding to a same downlink control information format of the same terminal device, or may be a resource element group corresponding to a different downlink control information format of the same terminal device.

In this optional embodiment, how to demodulate the downlink control information by using the reference signal may be determined in the following plurality of manners.

For example, a transmission manner of the control channel may be used to determine how to demodulate the downlink control information by using the reference signal. For example, if the transmission manner of the control channel is a discrete transmission manner, the downlink control information carried by each resource element group is demodulated based on only the reference signal carried by the resource element group. If the transmission manner of the control channel is a centralized transmission manner, the reference signal carried by each resource element group may be used to demodulate the downlink control information carried by the resource element group that carries the reference signal, and may also be used to demodulate the downlink control information carried by the another resource element group, to be specific, the reference signals carried by the plurality of resource element groups may be used to demodulate the downlink control information carried by the plurality of resource element groups.

For another example, the network device sends signaling to the terminal device, and the signaling is used to indicate how to demodulate the downlink control information by using the reference signal. Specifically, the network device may instruct the terminal device to demodulate, based on only the reference signal carried by each resource element group, the downlink control information carried by the resource element group, or instruct the terminal device to demodulate, by using the reference signals carried by the plurality of resource element groups, the downlink control information carried by the plurality of resource element groups.

Beamforming (beamforming) is an important technology in the NR communications system. The beamforming technology can be used to control a propagation direction by using an analog beam and/or a digital beam, so as to obtain a significant gain. When the control information or the control channel is transmitted in a beamforming transmission manner, a reference signal corresponding to the control channel is also transmitted by using a same beam, and different terminal devices may perform transmission based on different beams, and therefore a reference signal cannot be shared among terminal devices using different beam directions. Therefore, based on the self-contained resource element group, demodulation corresponding to a resource element group is performed based on only a reference signal carried by the resource element group, or performed based on only reference signals carried by a plurality of consecutive resource element groups corresponding to a same terminal device. This can enable transmissions of different resource element groups by using different beams, so that control information or control channels is/are sent to different terminal devices by highly flexibly and efficiently using the beamforming transmission manner. In addition, based on the self-contained resource element group, demodulation corresponding to the resource element group does not rely on a reference signal carried by another resource element group, thus a time-frequency resource corresponding to the another resource element group can be flexibly used to send a future unknown service, so as to be capable of supporting future new characteristics and being compatible with a current terminal device, and better supporting forward compatibility. In a future wireless communications technology or the NR system, the self-contained resource element group is applied to the beamforming technology, so that the control information can be transmitted by efficiently using the beamforming transmission manner, to make the control channel correspond to a beam direction in a centralized manner, thereby improving coverage of the control channel.

In an optional embodiment of the present disclosure, that a network device determines a resource element group corresponding to a control channel includes: determining, by the network device, a resource element included in the resource element group corresponding to the control channel, or determining a quantity of resource elements included in the resource element group corresponding to the control channel.

Further, optionally, the quantity of resource elements included in the resource element group is directly proportional to a quantity of symbols occupied by the resource element group; or the quantity of resource elements included in the resource element group is directly proportional to a quantity of symbols occupied by the control channel. The resource element group is any one of one or more resource element groups corresponding to the control channel. The quantity of resource elements included in the resource element group is directly proportional to the quantity of symbols occupied by the resource element group, so that when the resource element group occupies a plurality of symbols, a self-contained resource element group can still be implemented without adding a reference signal to each symbol, thereby reducing reference signal overheads.

Further, optionally, resource elements included in the resource element group are distributed in a part of symbols or all symbols occupied by the control channel. To be specific, a time-domain resource occupied by the control channel includes one or more symbols, and each symbol includes the first resource element and/or the second resource element. That resource elements included in the resource element group are distributed in all symbols occupied by the control channel, may indicate that at least one resource element is carried in each of all the symbols occupied by the control channel. The resource elements included in the resource element group are distributed in all symbols occupied by the control channel, so that when the control channel occupies a plurality of symbols, the self-contained resource element group can still be implemented without adding a reference signal to each symbol, thereby reducing reference signal overheads.

Further, optionally, frequency domain resources occupied by the resource element group are the same in all symbols occupied by the resource element group; or resource elements occupied by the resource element group are consecutive in each symbol occupied by the resource element group.

Alternatively, frequency domain resources occupied by the resource element group are the same in all symbols occupied by the control channel; or resource elements occupied by the resource element group are consecutive in each symbol occupied by the control channel. The frequency domain resources occupied by the resource element group are the same in all symbols occupied by the resource element group or in all symbols occupied by the control channel, preventing overlapping of corresponding frequency domain resources occupied by different resource element groups in different symbols, thereby preventing a reference signal from being shared on the different resource element groups.

Further, the present disclosure provides an optional embodiment. When determining the resource element group corresponding to the control channel, the network device first determines a quantity of resource element groups included in one resource block, and then determines the resource element group based on the quantity of resource element groups. Specifically, the network device determines a quantity $N_{REG}^{RU}$ of resource element groups included in one resource block, and determines, based on $N_{REG}^{RU}$, a resource element group corresponding to the control channel. The resource block includes l symbols in time domain and includes $N_{sc}^{RU}$ subcarriers in frequency domain, where l is an integer greater than or equal to 1, $N_{sc}^{RU}$ is an integer greater than or equal to 1, and $N_{REG}^{RU}$ is an integer greater than or equal to 1. Optionally, $N_{sc}^{RU}$ is equal to 12, or $N_{sc}^{RU}$ is equal to 16.

Further, optionally, the network device determines $N_{REG}^{RU}$ based on a quantity of resource elements corresponding to one antenna port. The antenna port may be one of at least one antenna port corresponding to the reference signal. The resource element corresponding to the antenna port is in one symbol, which is one of symbols in the resource block that carry the reference signal. $N_{REG}^{RU}$ is determined based on the quantity of resource elements corresponding to the antenna port, so that a second resource element included in each resource element group includes resource elements corresponding to all antenna ports corresponding to the reference signal. The resource elements corresponding to all antenna ports are resource elements corresponding to all antenna ports in a time-frequency resource occupied by the resource element group.

Further, optionally, the second resource element is in one symbol of a time domain resource occupied by the resource element group. For example, the second resource element is in a $1^{st}$ symbol of the time domain resource occupied by the resource element group, or in a $1^{st}$ symbol of a time domain resource occupied by the control channel, or in a $1^{st}$ symbol of a subframe that carries the control channel. The second resource element may be second resource elements included in all resource element groups corresponding to the control channel. The second resource element is in one symbol of the time domain resource occupied by the resource element group, so that when the resource element group occupies a plurality of symbols, the self-contained resource element group can still be implemented without adding a reference signal to each symbol, thereby reducing reference signal overheads.

Specifically, when the second resource element is in a $1^{st}$ symbol of the time domain resource occupied by the resource element group, a quantity of first resource elements included in the resource element group is $N_{RE}^{DCI}$, where $N_{RE}^{DCI} = (N_{sc}^{RU}/N_{REG}^{RU}) \times (l-1) + ((N_{sc}^{RU}/N_{REG}^{RU}) - N_{antenna\ port}^{RU})$, and $N_{antenna\ port}^{RU}$ is a quantity of antenna ports corresponding to the reference signal.

Further, optionally, the resource element group is distributed in all symbols of the resource block, and a quantity of resource elements included in the resource element group is equal to $(N_{sc}^{RU}/N_{REG}^{RU}) \times l$.

Further, optionally, a quantity of resource element groups included in each control channel element may vary with the quantity of symbols occupied by the control channel. When the control channel occupies one symbol, a quantity of resource element groups included in one control channel element is $N_{REG}^{CCE}$; or when the control channel occupies l symbols, a quantity of resource element groups included in one control channel element is $$\left\lceil \frac{N_{REG}^{CCE} \times \left( \left( N_{sc}^{RU} / N_{REG}^{RU} \right) - N_{antenna\,port}^{RU} \right)}{\left( N_{sc}^{RU} / N_{REG}^{RU} \right) \times (l-1) + \left( \left( N_{sc}^{RU} / N_{REG}^{RU} \right) - N_{antenna\,port}^{RU} \right)} \right\rceil.$$

In this optional manner, even if the quantity of symbols occupied by the control channel changes, a quantity of first resource elements included in one control channel element can remain essentially unchanged, thereby simplifying a control channel design. "⌈ ⌉" in the foregoing formula is a round-up symbol.

In an optional embodiment of the present disclosure, when sending the downlink control information by using the control channel, the network device sends the downlink control information in a subframe n, and the terminal device receives the downlink control information in the subframe n, where n is an integer greater than or equal to 0.

Optionally, the downlink control information includes antenna port information, and the antenna port information is used to indicate an antenna port corresponding to a control channel carried in a subframe n+k, where k is an integer greater than or equal to 0. The antenna port information may be information about antenna ports respectively corresponding to a plurality of terminal devices. The antenna port corresponding to the control channel may be an antenna port corresponding to a reference signal corresponding to the control channel, and further, may be an antenna port that is in the antenna ports corresponding to the reference signal carried by the resource element group and that is used by one or more of the plurality of terminal devices to demodulate the downlink control information. The downlink control information is dynamically sent to indicate the antenna port corresponding to the control channel, which can better support multi-user multiple-input multiple-output (MU-MIMO), to be specific, a same resource element group can be used to carry control information or control channels corresponding to a plurality of user devices, but the plurality of user devices demodulate control channels by using different antenna ports corresponding to the reference signal respectively.

In this embodiment of the present disclosure, system information is used to indicate information about the antenna port corresponding to the reference signal carried by the resource element group or density information of the reference signal. In an optional embodiment, the network device sends the system information to the terminal device, and the terminal device receives the system information. The system information includes the information about the antenna port corresponding to the reference signal or the density information of the reference signal. Based on different requirements of different wireless communications systems for the system information, the system information may alternatively include another type of information, and this is not specifically limited herein. The system information may include one or more of the following plurality of types of information.

For example, the information about the antenna port included in the system information may be a quantity of antenna ports corresponding to the reference signal. For example, the system information may indicate that the quantity of antenna ports corresponding to the reference signal carried by the resource element group is 2 or 4.

For another example, the density information of the reference signal may include a quantity of resource elements included in one resource element group that are used for the reference signal. Higher density of the reference signal indicated by the density information indicates a larger quantity of corresponding resource elements. Lower density indicated by the density information indicates a smaller quantity of corresponding resource elements. The density information may be expressed by a defined value, level, or other information.

Specifically, a sending moment or period of the system information depends on a type of information that carries the system information. For example, the system information may be carried by a master information block (MIB), and the system information is sent according to a sending period or a sending moment of the MIB.

In this embodiment of the present disclosure, the system information is used to indicate the information about the antenna port corresponding to the reference signal carried by the resource element group or the density information of the reference signal, so as to implement flexible configuration of the quantity of antenna ports corresponding to the reference signal carried by the resource element group, to better meet requirements of an actual scenario. For example, setting a plurality of antenna ports enables a transmit diversity transmission manner. Therefore, when a channel condition is relatively poor in an actual scenario, a plurality of antenna ports are needed to improve transmission performance of a control channel, and therefore a relatively large quantity of antenna ports may be configured; and vice versa. The system information is used to indicate density of the reference signal carried by the resource element group, so as to implement flexible configuration of the density of the reference signal carried by the resource element group, to better meet requirements of an actual scenario.

In another optional embodiment, the network device sends the control information obtained after channel coding to the terminal device by using the control channel, and the terminal device receives the control information on the control channel. The control channel may be transmitted in the following manners.

For example, transmission of the control channel is performed in a discrete transmission manner: A control channel carrying downlink control information (DCI) is transmitted on a time-frequency resource of the control channel, and a time-frequency resource occupied by the control channel carrying the DCI is discretely distributed in the time-frequency resource of the control channel. For example, a resource element group corresponding to the control channel carrying the downlink control information DCI is discretely distributed in the time-frequency resource of the control channel. Transmitting the control channel in the discrete manner can obtain more diversity gains, so as to improve performance of the control channel.

For another example, transmission of the control channel is performed in a centralized transmission manner. A control channel carrying DCI is transmitted on a time-frequency resource of the control channel, and a time-frequency resource occupied by the control channel carrying the DCI is distributed in the time-frequency resource of the control channel in a centralized manner. For example, a resource element group corresponding to the control channel carrying the downlink control information DCI is distributed in a part of the time-frequency resource of the control channel in a centralized manner. During transmission of the control channel in the centralized transmission manner, the beamforming transmission manner can be used to make the control channel correspond to a beam direction in a centralized manner, thereby improving coverage of the control channel. In addition, the control channel is transmitted in the centralized transmission manner, so that a user device can perform channel estimation by using reference signals on a resource used in the centralized manner, thereby improving channel estimation performance and improving performance of the control channel transmitted based on the beam transmission manner.

In this embodiment of the present disclosure, a resource element group is defined. The resource element group includes a resource element used to transmit downlink control information and a resource element used to transmit a reference signal. The reference signal is used for demodulation corresponding to the resource element group. When the resource element group is a self-contained resource element group, the control information can be transmitted by efficiently using the beamforming transmission manner, to make the control channel correspond to a beam direction in a centralized manner, thereby improving coverage of the control channel.

When the control information or the control channel is transmitted in the beamforming transmission manner, a reference signal corresponding to the control channel is also transmitted by using a same beam, and different terminal devices may perform transmission based on different beams, and therefore a reference signal cannot be shared among terminal devices using different beam directions.

When the self-contained resource element group is used, downlink control information carried by the resource element group is demodulated based on only a reference signal carried by the resource element group, or is demodulated based on only reference signals carried by a plurality of consecutive resource element groups corresponding to one terminal device. A demodulation manner corresponding to the self-contained resource element group can enable transmissions of different resource element groups by using different beams, so that control information or control channels is/are sent to different terminal devices by highly flexibly and efficiently using the beamforming transmission manner.

In addition, demodulation corresponding to the resource element group is performed based on only the reference signal carried by the resource element group, and because demodulation corresponding to the resource element group does not rely on a reference signal carried by another resource element group, a time-frequency resource corresponding to the another resource element group can be flexibly used to send a future unknown service, so as to be capable of supporting future new characteristics and being compatible with a current terminal device. Therefore, the self-contained resource element group can better support forward compatibility.

Figure 3:
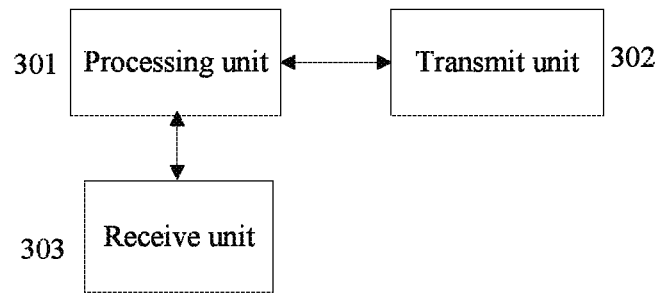
FIG. 3 is a possible schematic structural diagram of a network device according to an embodiment of the present disclosure.

FIG. 3 is a possible schematic structural diagram of a network device in an embodiment of the present disclosure.

The network device includes a processing unit 301, a transmit unit 302, and a receive unit 303. Based on an actual requirement, the network device may further include a storage unit (which is not shown in the figure) and the like.

The processing unit 301 is configured to determine a resource element group corresponding to a control channel. The resource element group includes a first resource element for carrying downlink control information and a second resource element for carrying a reference signal, and the reference signal is used to demodulate the downlink control information carried by the resource element group.

The transmit unit 302 is configured to send the downlink control information by using the control channel.

The receive unit 303 is configured to receive information and data sent by another network device or a terminal device.

In an embodiment of the present disclosure, the processing unit 301 determines the resource element group corresponding to the control channel. The resource element group corresponding to the control channel may be one resource element group corresponding to the control channel. In this case, the reference signal is used to demodulate the downlink control information carried by the resource element group.

In another optional embodiment, the processing unit 301 determines the resource element group corresponding to the control channel. The resource element group corresponding to the control channel may alternatively be each of a plurality of resource element groups corresponding to the control channel. In this case, the reference signal is used to demodulate downlink control information carried by one or more of the plurality of resource element groups.

For the case in which the resource element group corresponding to the control channel is each of a plurality of resource element groups, there may be a plurality of relationships between the reference signal and the downlink control information.

In an implementation, for each of the plurality of resource element groups corresponding to the control channel, a reference signal carried by each resource element group may be used to demodulate downlink control information carried by the resource element group that carries the reference signal, and may also be used to demodulate downlink control information carried by another resource element group. To be specific, reference signals carried by each of the plurality of resource element groups may be used to demodulate downlink control information carried by the plurality of resource element groups. For example, when there are two resource element groups corresponding to a control channel: a resource element group 1 and a resource element group 2, a reference signal carried by the resource element group 1 may be used to demodulate downlink control information carried by the resource element group 1 and may also be used to demodulate downlink control information carried by the resource element group 2.

Specifically, when the reference signals carried by the plurality of resource element groups are used to demodulate the downlink control information carried by the plurality of resource element groups, the plurality of resource element groups may be a plurality of resource element groups corresponding to one terminal device, or may be a plurality of resource element groups corresponding to different terminal devices.

In another implementation, for each of the plurality of resource element groups corresponding to the control channel, downlink control information carried by each resource element group is demodulated based on only a reference signal carried by the resource element group, to be specific, demodulation of downlink control information carried by a resource element group does not rely on a reference signal carried by another resource element group: or downlink control information carried by each resource element group is demodulated based on only reference signals carried by a plurality of consecutive resource element groups corresponding to one terminal device. The foregoing two types of resource element groups are referred to as self-contained resource element groups. For example, when there are two resource element groups corresponding to a control channel; a resource element group 1 and a resource element group 2, a reference signal carried by the resource element group 1 can be used to demodulate only downlink control information carried by the resource element group 1, and downlink control information carried by the resource element group 2 cannot be demodulated by using the reference signal carried by the resource element group 1. Alternatively, when there are a plurality of resource element groups corresponding to a control channel: a resource element group 1, a resource element group 2, . . . , and a resource element group k, k is greater than or equal to 3, and the resource element group 1, the resource element group 2, and the resource element group 3 are a plurality of consecutive resource element groups corresponding to one terminal device, downlink control information carried by the resource element group 1 may be demodulated based on a reference signal carried by any one or more of the resource element group 1, the resource element group 2, and the resource element group 3.

Further, the present disclosure provides an optional embodiment. The processing unit 301 determines a quantity of resource element groups included in one resource block, to determine the resource element group corresponding to the control channel. Specifically, the processing unit 301 determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines, based on $N_{REG}^{RU}$, the resource element group corresponding to the control channel.

Further, optionally, the processing unit 301 is configured to determine $N_{REG}^{RU}$ based on a quantity of resource elements corresponding to one antenna port. The antenna port is one of at least one antenna port corresponding to the reference signal, the resource element corresponding to the antenna port is in one symbol, which is one of symbols in the resource block that carry the reference signal.

Optionally, the second resource element is in one symbol of a time domain resource occupied by the resource element group. For example, the second resource element is in a $1^{st}$ symbol of the time domain resource occupied by the resource element group, or in a $1^{st}$ symbol of a time domain resource occupied by the control channel, or in a $1^{st}$ symbol of a subframe that carries the control channel. The second resource element may be a second resource element included in all resource element groups corresponding to the control channel. The second resource element is in one symbol of the time domain resource occupied by the resource element group, so that when the resource element group occupies a plurality of symbols, a self-contained resource element group can still be implemented without adding a reference signal to each symbol, thereby reducing reference signal overheads.

Specifically, when the second resource element is in a $1^{st}$ symbol of the time domain resource occupied by the resource element group, a quantity of first resource elements included in the resource element group is $N_{RE}^{DCI}$, where $N_{RE}^{DCI} = (N_{sc}^{RU}/N_{REG}^{RU}) \times (l-1) + ((N_{sc}^{RU}/N_{REG}^{RU}) - N_{antenna\ port}^{RT})$, and $N_{antenna\ port}^{RU}$ is a quantity of antenna ports corresponding to the reference signal.

Further, optionally, the processing unit 301 is configured to determine that the resource element group is distributed in all symbols of the resource block, and a quantity of resource elements included in the resource element group is equal to $(N_{sc}^{RU}/N_{REG}^{RU}) \times l$.

In still another embodiment of the present disclosure, the transmit unit 302 sends the downlink control information in a subframe n by using the control channel, where n is an integer greater than or equal to 0.

Optionally, the downlink control information includes antenna port information, and the antenna port information is used to indicate an antenna port corresponding to a control channel carried in a subframe n+k, where k is an integer greater than or equal to 0. The antenna port information may be information about antenna ports respectively corresponding to a plurality of terminal devices. The antenna port corresponding to the control channel may be an antenna port corresponding to a reference signal corresponding to the control channel, and further, may be an antenna port that is in the antenna ports corresponding to the reference signal carried by the resource element group and that is used by one or more of the plurality of terminal devices to demodulate the downlink control information. The transmit unit dynamically sends the downlink control information to indicate the antenna port corresponding to the control channel. This can better support multi-user MIMO (MU-MIMO), to be specific, a same resource element group can be used to carry control information or control channels corresponding to a plurality of user devices, but the plurality of user devices demodulate control channels by using different antenna ports corresponding to the reference signal respectively.

In this embodiment of the present disclosure, system information is used to indicate information about the antenna port corresponding to the reference signal carried by the resource element group or density information of the reference signal. In an optional embodiment, the transmit unit 302 is configured to send the system information. The system information includes the information about the antenna port corresponding to the reference signal or the density information of the reference signal.

Based on different requirements of different wireless communications systems for the system information, the system information may alternatively include another type of information, and this is not specifically limited herein. The system information may include one or more of the following plurality of types of information.

For example, the information about the antenna port included in the system information may be a quantity of antenna ports corresponding to the reference signal. For example, the system information may indicate that the quantity of antenna ports corresponding to the reference signal carried by the resource element group is 2 or 4.

For another example, the density information of the reference signal may include a quantity of resource elements included in one resource element group that are used for the reference signal. Higher density of the reference signal indicated by the density information indicates a larger quantity of corresponding resource elements. Lower density indicated by the density information indicates a smaller quantity of corresponding resource elements. The density information may be expressed by a defined value, level, or other information.

Specifically, a sending moment or period of the system information depends on a type of information that carries the system information. For example, the system information may be carried by a master information block (MIB), and the system information is sent according to a sending period or a sending moment of the MIB.

The network device in this embodiment of the present disclosure may be configured to execute the method in the embodiment corresponding to FIG. 2. For specific implementations in which the network device determines the resource element group corresponding to the control channel and sends the downlink control information and the reference signal, refer to descriptions in the method embodiment. Specific functions of the processing unit 301, the transmit unit 302, and the receive unit 303 that are included in the network device are respectively corresponding to functions in the embodiment corresponding to FIG. 2, and terms and implementation details thereof are similar to those in the method embodiment.

It should be noted that in actual application, functional units of the network device in this embodiment may be implemented by corresponding hardware, or may be completed by corresponding hardware executing corresponding software. For example, the transmit unit 302 may be hardware capable of executing the foregoing functions of a sending module, for example, a transmitter, or may be a general purpose processor or another hardware device capable of executing a corresponding computer program to complete the foregoing functions. For another example, the processing unit 301 may be hardware capable of executing the functions of a processing module, for example, a processor, or may be another hardware device capable of executing a corresponding computer program to complete the foregoing functions. For another example, the receive unit 303 may be hardware capable of executing the functions of a receive module, for example, a receiver, or may be a general purpose processor or another hardware device capable of executing a corresponding computer program to complete the foregoing functions.

Figure 4:
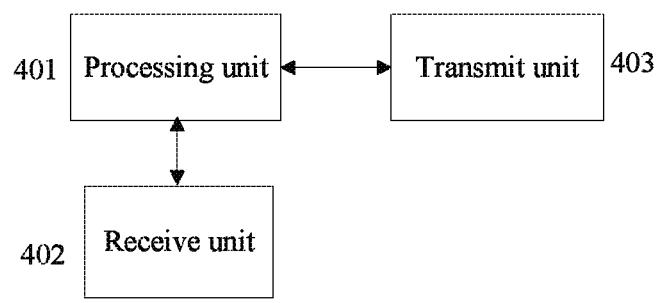
FIG. 4 is a possible schematic structural diagram of a terminal device according to an embodiment of the present disclosure.

FIG. 4 is a possible schematic structural diagram of a terminal device in an embodiment of the present disclosure.

The terminal device includes a processing unit 401, a receive unit 402, and a transmit unit 403. Based on an actual requirement, the terminal device may further include a storage unit (which is not shown in the figure) and the like.

The processing unit 401 is configured to determine a resource element group corresponding to a control channel, where the resource element group includes a first resource element for carrying downlink control information and a second resource element for carrying a reference signal, and the downlink control information carried by the resource element group is demodulated based on the reference signal.

The receive unit 402 is configured to receive the downlink control information on the control channel.

The transmit unit 403 is configured to send information and data to a network device or another terminal device.

In an embodiment of the present disclosure, the processing unit 401 determines the resource element group corresponding to the control channel. The resource element group corresponding to the control channel may be one resource element group corresponding to the control channel. In this case, the processing unit 401 demodulates, by using the reference signal, the downlink control information carried by the resource element group.

In another optional embodiment, the processing unit 401 determines the resource element group corresponding to the control channel. The resource element group corresponding to the control channel may alternatively be each of a plurality of resource element groups corresponding to the control channel. In this case, the processing unit 401 demodulates, by using the reference signal, downlink control information carried by one or more of the plurality of resource element groups.

For the case in which the resource element group corresponding to the control channel is each of a plurality of resource element groups, there may be a plurality of relationships between the reference signal and the downlink control information. For specific relationship types, refer to descriptions in the method embodiment corresponding to FIG. 2. Details are not described herein again.

Further, the present disclosure provides an optional embodiment. When determining the resource element group corresponding to the control channel, the processing unit 401 first determines a quantity of resource element groups included in one resource block, and then determines, based on the quantity of resource element groups, the resource element group corresponding to the control channel. Specifically, the processing unit 401 determines a quantity $N_{REG}^{RU}$ of resource element groups included in one resource block, where the resource block includes l symbols in time domain and includes $N_{sc}^{RU}$ subcarriers in frequency domain, l is an integer greater than or equal to 1, $N_{sc}^{RU}$ is an integer greater than or equal to 1, and $N_{REG}^{RU}$ is an integer greater than or equal to 1; and determines the resource element group based on $N_{REG}^{RU}$.

Further, optionally, the processing unit 401 determines $N_{REG}^{RU}$ based on a quantity of resource elements corresponding to one antenna port. The antenna port is one of at least one antenna port corresponding to the reference signal, the resource element corresponding to the antenna port is in one symbol, which is one of symbols in the resource block that carry the reference signal.

Further, optionally, the second resource element is in one symbol of a time domain resource occupied by the resource element group. For example, the second resource element is in a $1^{st}$ symbol of the time domain resource occupied by the resource element group, or in a $1^{st}$ symbol of a time domain resource occupied by the control channel, or in a $1^{st}$ symbol of a subframe that carries the control channel.

Specifically, when the second resource element is in a $1^{st}$ symbol of the time domain resource occupied by the resource element group, a quantity of first resource elements included in the resource element group is $N_{RE}^{DCI}$, where $N_{RE}^{DCI}=(N_{sc}^{RU}/N_{REG}^{RU})\times(l-1)+((N_{sc}^{RU}/N_{REG}^{RU})-N_{antenna\ port}^{RU})$, and $N_{antenna\ port}^{RU}$ is a quantity of antenna ports corresponding to the reference signal.

Further, optionally, the processing unit 401 determines that the resource element group is distributed in all symbols of the resource block, and a quantity of resource elements included in the resource element group is equal to $(N_{sc}^{RU}/N_{REG}^{RU})\times l$.

In an optional embodiment of the present disclosure, the receive unit 402 receives the downlink control information in a subframe n by using the control channel, where n is an integer greater than or equal to 0.

Optionally, the downlink control information includes antenna port information, and the antenna port information is used to indicate an antenna port corresponding to a control channel carried in a subframe n+k, where k is an integer greater than or equal to 0. The antenna port information may be information about antenna ports respectively corresponding to a plurality of terminal devices. The antenna port corresponding to the control channel may be an antenna port corresponding to a reference signal corresponding to the control channel, and further, may be an antenna port that is in the antenna ports corresponding to the reference signal carried by the resource element group and that is used by one or more of the plurality of terminal devices to demodulate the downlink control information. The receive unit receives the downlink control information sent by the network device, to determine the antenna port corresponding to the control channel. This can better support multi-user MIMO (MU-MIMO), to be specific, a plurality of users use a same resource element group to receive control information or control channels, but use different antenna ports corresponding to the reference signal, to demodulate control channels of the plurality of users.

In this embodiment of the present disclosure, system information is used to indicate information about the antenna port corresponding to the reference signal carried by the resource element group or density information of the reference signal. In an optional embodiment, the receive unit 402 receives the system information. The system information includes the information about the antenna port corresponding to the reference signal or the density information of the reference signal. Based on different requirements of different wireless communications systems for the system information, the system information may alternatively include another type of information, and this is not specifically limited herein. The system information may include one or more of a plurality of types of information. For a specific type of the system information, refer to descriptions in the method embodiment corresponding to FIG. 2, and details are not described herein again.

Optionally, a receiving moment or period of the system information depends on a type of information that carries the system information. For example, the system information may be carried by a master information block MIB, and the system information is received according to a sending period or a sending moment of the MIB.

In yet another optional embodiment, the terminal device receives, on the control channel, the control information obtained after channel coding performed by the network device. The control channel may be received in the following manner.

For example, that transmission of the control channel is performed in a discrete transmission manner may mean that a control channel carrying downlink control information DCI is transmitted on a time-frequency resource of the control channel, and a time-frequency resource occupied by the control channel carrying the downlink control information DCI is discretely distributed in the time-frequency resource of the control channel. For example, a resource element group corresponding to the control channel carrying the downlink control information DCI is discretely distributed in the time-frequency resource of the control channel. Transmitting the control channel in the discrete manner can obtain more diversity gains, so as to improve performance of the control channel.

For another example, that transmission of the control channel is performed in a centralized transmission manner may mean that a control channel carrying downlink control information DCI is transmitted on a time-frequency resource of the control channel, and a time-frequency resource occupied by the control channel carrying the downlink control information DCI is distributed in the time-frequency resource of the control channel in a centralized manner. For example, a resource element group corresponding to the control channel carrying the downlink control information DCI is distributed in a part of the time-frequency resource of the control channel in a centralized manner. During transmission of the control channel in the centralized transmission manner, a beamforming transmission manner can be used to make the control channel correspond to a beam direction in a centralized manner, thereby improving coverage of the control channel. In addition, the control channel is transmitted in the centralized transmission manner, so that a user device can use reference signals on a resource used in the centralized manner, to perform channel estimation, thereby improving channel estimation performance and improving performance of the control channel transmitted based on the beam transmission manner.

The terminal device in this embodiment of the present disclosure may be configured to execute the method in the embodiment corresponding to FIG. 2. For specific implementations in which the terminal device determines the resource element group corresponding to the control channel and receives the downlink control information and the reference signal, refer to descriptions in the method embodiment. Specific functions of the processing unit 401, the receive unit 402, and the transmit unit 403 that are included in the terminal device are respectively corresponding to functions in the embodiment corresponding to FIG. 2, and terms and implementation details thereof are similar to those in the method embodiment.

It should be noted that in actual application, functional units of the terminal device in this embodiment may be implemented by corresponding hardware, or may be completed by corresponding hardware executing corresponding software. For example, the transmit unit 403 may be hardware capable of executing the foregoing functions of a sending module, for example, a transmitter, or may be a general purpose processor or another hardware device capable of executing a corresponding computer program to complete the foregoing functions. For another example, the processing unit 401 may be hardware capable of executing the functions of a processing module, for example, a processor, or may be another hardware device capable of executing a corresponding computer program to complete the foregoing functions. For another example, the receive unit 402 may be hardware capable of executing the functions of a receive module, for example, a receiver, or may be a general purpose processor or another hardware device capable of executing a corresponding computer program to complete the foregoing functions.

It should be noted that the symbol in all the embodiments of the present disclosure may be a single carrier frequency division multiple access (SC-FDMA) symbol, or may be an orthogonal frequency division multiplexing (OFDM) symbol. The reference signal in the embodiments of the present disclosure may be a demodulation reference signal (DMRS).

It should be understood that "one embodiment", "an embodiment", or "an embodiment of the present disclosure" mentioned throughout this specification means that particular features, structures, or characteristics related to the embodiment are included in at least one embodiment of the present disclosure. Therefore, "in one embodiment", "in an embodiment", or "in an embodiment of the present disclosure" that appears throughout this specification does not necessarily mean a same embodiment. Moreover, the particular features, structures, or characteristics may be combined in one or more embodiments in any proper manner.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

In addition, the terms "system" and "network" may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application. "B corresponding to A" indicates that B is associated with A, and B may be determined based on A. However, it should further be understood that determining B based on A does not mean that B is determined based on A only; that is, B may also be determined based on A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In several embodiments provided in this application, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A computer-readable storage medium comprising instructions which, when executed by a device, cause the device to perform operations comprising:
   determining at least one control channel element (CCE) corresponding to a control channel, wherein each CCE comprises a plurality of resource element sets, each resource element set of the plurality of resource element sets comprises a first resource element for carrying downlink control information and a second resource element for carrying a demodulation reference signal (DMRS), and the DMRS is used to demodulate the downlink control information carried by the control channel; and
   sending the downlink control information and the DMRS by using the control channel, wherein:
   the control channel occupies one or more symbols, and
   in a first case where the control channel occupies only one symbol, the each resource element set occupies the same only one symbol, and frequency domain resources occupied by the each resource element set are consecutive in the only one symbol, or
   in a second case where the control channel occupies more than one symbol, the each resource element set occupies the same more than one symbol, frequency domain resources occupied by the each resource element set are the same in all of the more than one symbol, and the frequency domain resources occupied by the each resource element set are consecutive in each of the more than one symbol.

2. The computer-readable storage medium according to claim 1, wherein the operations further comprise:
   sending first signaling, wherein the first signaling is used to instruct a terminal device to demodulate, based on only the DMRS carried by the resource element set, the downlink control information carried by the resource element set, or
   the first signaling is used to instruct the terminal device to demodulate, based on the DMRS carried by the resource element set and a DMRS carried by another resource element set other than the resource element set, the downlink control information carried by the resource element set, wherein the another resource element set is corresponding to the control channel.

3. The computer-readable storage medium according to claim 1, wherein:
   a quantity of resource elements comprised in the resource element set is directly proportional to a quantity of symbols occupied by the resource element set; or
   the quantity of resource elements comprised in the resource element set is directly proportional to a quantity of symbols occupied by the control channel.

4. The computer-readable storage medium according to claim 1, wherein:
   the DMRS carried by the plurality of resource element sets are used to demodulate the downlink control information carried by the plurality of resource element sets.

5. The computer-readable storage medium according to claim 1, wherein:
   the downlink control information carried by the resource element set is demodulated based on only the DMRS carried by the resource element set; or
   the downlink control information carried by the resource element set is demodulated based on the DMRS carried by the resource element set and a DMRS carried by another resource element set other than the resource element set, and the another resource element set is corresponding to the control channel.

6. A computer-readable storage medium comprising instructions which, when executed by a computer system, cause the computer system to perform operations comprising:
   determining at least one control channel element (CCE) corresponding to a control channel, wherein each CCE comprises a plurality of resource element sets, each resource element set of the plurality of the resource element sets comprises a first resource element for carrying downlink control information and a second resource element for carrying a DMRS, and the downlink control information carried by the resource element set is demodulated based on the DMRS; and
   receiving the downlink control information and the DMRS on the control channel; wherein:
   the control channel occupies one or more symbols, and
   in a first case where the control channel occupies only one symbol, the each resource element set occupies the same only one symbol, and frequency domain resources occupied by the each resource element set are consecutive in the only one symbol, or
   in a second case where the control channel occupies more than one symbol, the each resource element set occupies the same more than one symbol, frequency domain resources occupied by the each resource element set are the same in all of the more than one symbol, and the frequency domain resources occupied by the each resource element set are consecutive in each of the more than one symbol.

7. The computer-readable storage medium according to claim 6, wherein the operations further comprise:
   receiving first signaling; and
   demodulating, based on the first signaling, the downlink control information carried by the resource element set.

8. The computer-readable storage medium according to claim 6, wherein:
   a quantity of resource elements comprised in the resource element set is directly proportional to a quantity of symbols occupied by the resource element set; or
   the quantity of resource elements comprised in the resource element set is directly proportional to a quantity of symbols occupied by the control channel.

9. The computer-readable storage medium according to claim 6, wherein the operations further comprise:
   demodulating the downlink control information carried by the resource element set based on only the DMRS; or
   demodulating the downlink control information carried by the resource element set based on a DMRS carried by another resource element set other than the resource element set, wherein the another resource element set is corresponding to the control channel.

10. An apparatus, comprising:
    one or more processors; and
    one or more memories, wherein the one or more memories store a computer program for execution by the one or more processors to perform operations comprising:
    determining at least one control channel element (CCE) corresponding to a control channel, wherein each CCE comprises a plurality of resource element sets, each resource element set of the plurality of resource element sets comprises a first resource element for carrying downlink control information and a second resource element for carrying a DMRS, and the DMRS is used to demodulate the downlink control information carried by the control channel; and
    sending the downlink control information and the DMRS by using the control channel, wherein:
    the control channel occupies one or more symbols, and
    in a first case where the control channel occupies only one symbol, the each resource element set occupies the same only one symbol, and frequency domain resources occupied by the each resource element set are consecutive in the only one symbol, or
    in a second case where the control channel occupies more than one symbol, the each resource element set occupies the same more than one symbol, frequency domain resources occupied by the each resource element set are the same in all of the more than one symbol, and the frequency domain resources occupied by the each resource element set are consecutive in each of the more than one symbol.

11. The apparatus according to claim 10, wherein the operations further comprise:
    sending a first signaling, wherein:
    the first signaling is used to instruct a terminal device to demodulate, based on only the DMRS carried by the resource element set, the downlink control information carried by the resource element set, or
    the first signaling is used to instruct the terminal device to demodulate, based on the DMRS carried by the resource element set and a DMRS carried by another resource element set other than the resource element set, the downlink control information carried by the resource element set, wherein the another resource element set is corresponding to the control channel.

12. The apparatus according to claim 10, wherein:
    a quantity of resource elements comprised in the resource element set is directly proportional to a quantity of symbols occupied by the resource element set; or
    the quantity of resource elements comprised in the resource element set is directly proportional to a quantity of symbols occupied by the control channel.

13. The apparatus according to claim 10, wherein:
    the DMRS carried by the plurality of resource element sets are used to demodulate the downlink control information carried by the plurality of resource element sets.

14. The apparatus according to claim 10, wherein:
    the downlink control information carried by the resource element set is demodulated based on only the DMRS carried by the resource element set; or
    the downlink control information carried by the resource element set is demodulated based on the DMRS carried by the resource element set and a DMRS carried by another resource element set other than the resource element set, and the another resource element set is corresponding to the control channel.

15. An apparatus, comprising:
    one or more processors; and
    one or more memories, wherein the one or more memories store a computer program for execution by the one or more processors to perform operations comprising:
    determining at least one control channel element (CCE) corresponding to a control channel, wherein each CCE comprises a plurality of resource element sets, each resource element set of the plurality of the resource element sets comprises a first resource element for carrying downlink control information and a second resource element for carrying a DMRS, and the downlink control information carried by the resource element set is demodulated based on the DMRS; and receiving the downlink control information and the DMRS on the control channel; wherein:

the control channel occupies one or more symbols, and in a first case where the control channel occupies only one symbol, the each resource element set occupies the same only one symbol, and frequency domain resources occupied by the each resource element set are consecutive in the only one symbol, or in a second case where the control channel occupies more than one symbol, the each resource element set occupies the same more than one symbol, frequency domain resources occupied by the each resource element set are the same in all of the more than one symbol, and the frequency domain resources occupied by the each resource element set are consecutive in each of the more than one symbol.

16. The apparatus according to claim 15, wherein the operations further comprise:

receiving first signaling; and demodulating, based on the first signaling, the downlink control information carried by the resource element set.

17. The apparatus according to claim 15, wherein:

a quantity of resource elements comprised in the resource element set is proportional to a quantity of symbols occupied by the resource element set; or the quantity of resource elements comprised in the resource element set is proportional to a quantity of symbols occupied by the control channel.

18. The apparatus according to claim 15, wherein the operations further comprise:

demodulating the downlink control information carried by the resource element set based on only the DMRS; or demodulating the downlink control information carried by the resource element set based on a DMRS carried by another resource element set other than the resource element set, wherein the another resource element set is corresponding to the control channel.

\* \* \* \* \*